March 27, 1951 C. C. CREAMER, JR 2,546,726
MOBILE SLING FOR CRIPPLED ANIMALS
Filed Sept. 30, 1948
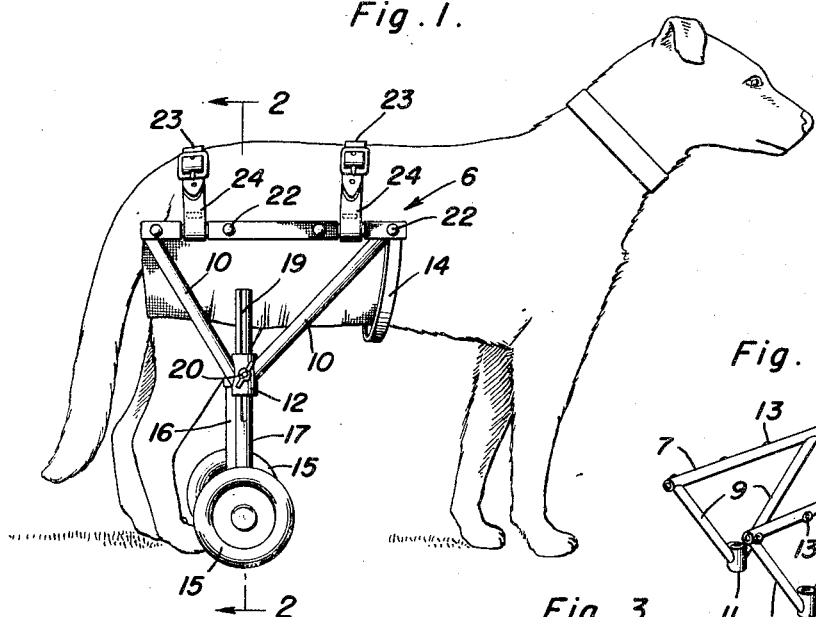
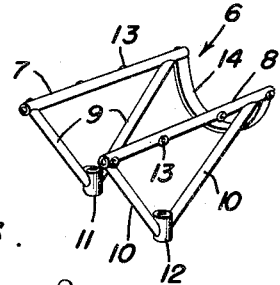
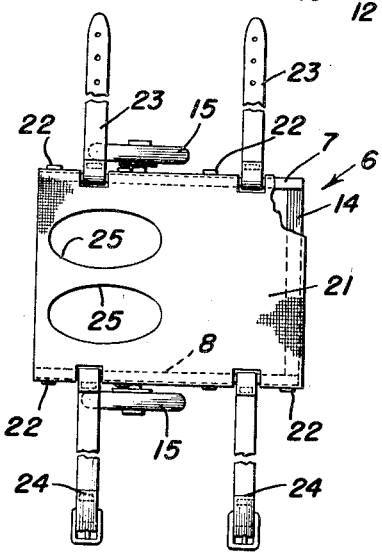
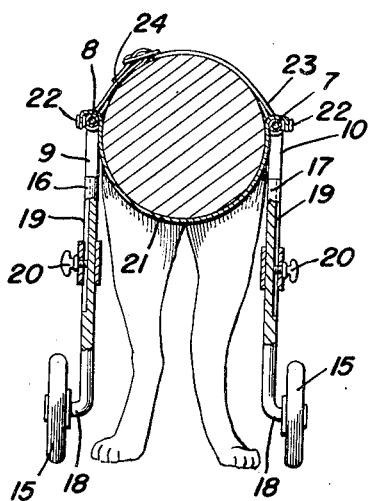
Carl C. Creamer, Jr.
INVENTOR.
BY Clarence A. O'Brien
and Harvey B. Jackson
Attorneys Patented Mar. 27, 1951

2,546,726

UNITED STATES PATENT OFFICE 2,546,726

MOBILE SLING FOR CRIPPLED ANIMALS

Carl C. Creamer, Jr., Washington, D. C.

Application September 30, 1948, Serial No. 52,023

4 Claims. (Cl. 119—1)

1

This invention relates to a novel rollable suspensory-type sling which is especially, but not necessarily, adapted to enable cripple pets, such as dogs and cats, to ambulate sufficiently to satisfy ordinary indoors, and limited out-of-doors requirements of daily exercise and activity.

Due to certain injuries, obesity attending old age, paralysis and other crippling and handicapping conditions, dogs, for instance, become lame and lose the use of their hind legs and so injured they are unable to walk and romp about. If so restrained against minimum exercise, activity and motivation, a dog soon becomes hopelessly incapacitated and grieves itself to death. Many are those instances in which valuable pets have been lost and, as a humane step, I have discovered the need for a mechanical aid or contrivance, corresponding to crutches for the human, but mobile for a dog, whereby through the use thereof, an otherwise immobile animal is enabled under its own will and power to get around and about despite the stated difficulties.

More specifically, in reducing to practice a preferred embodiment of the invention, I have evolved and produced a simple, economical and efficient contrivance or appliance which invokes the use, as a principal part, of a canvas sling, said sling being saddled or harnessed upon the desired portion of the crippled animal's body and being suspended in and by a carriage or other mobile support, whereby to elevate the hind legs and rear portion of the body sufficiently clear of the ground to permit the animal, using his front legs, to move about with acceptable facility.

Another object of the invention has to do with a mechanical aid for a dog or the like which has to do with the use of a freely rollable wheeled carriage or equivalent support, the latter having a sling for convenient reception of the hinderquarters of the animal, said sling being applied and appropriately attached in such a way that while the carriage elevates and suitably supports the animal, the leg is nevertheless free to ride clear above the ground or in light movable contact with the same depending on the nature of the injuries present.

More explicitly, and in its preferred embodiment, the invention has to do with a canvas or equivalent sling having holes therein for passage of either the hind, or front, legs of the dog whereby the body portion of the dog may be saddled in the sling and the sling attached by harnessing straps, said sling being detach-

2 ably mounted on a wheel-supported carriage which is such as to enable the dog to cart the injured portion of his body under the power and action of his freely available (front or rear) legs.

Other objects and advantages will become more readily apparent from the following description and the accompanying illustrative drawings.

In the drawings, wherein like numerals are employed to designate like parts throughout the views:

Figure 1 is a side elevational view of a sling or ambulatory mechanical aid for a dog constructed in accordance with the present invention and showing construction of same and the manner in which it is applied and used;

Figure 2 is a central vertical section on the line 2—2 of Figure 1, looking in the direction of the arrows;

Figure 3 is a fragmentary plan view of the appliance per se with a portion broken away and with the harnessing straps fragmentarily shown;

Figure 4 is a perspective view of the carriage framework.

Referring now to the drawings by reference numerals and lead lines, it will be seen that the rollable support or, more specifically, the wheeled carriage, embodies a suitably constructed lightweight metal or equivalent framework 6 of the type illustrated in Figure 4. The framework is made up of two opposed parallel triangular frame units, each including horizontal frame members 7 and 8 and converging braces 9 and 10. The braces are attached to and depend from the frame members 7 and 8, and at their converging ends they are provided with guide and assembling sleeves 11 and 12. The numerals 13 designate snap fasteners on the horizontal members, and the numeral 14 designates a substantially rigid longitudinally bowed connecting strap which joins the two frame units in the stated parallelism. The rubber tired wheels 15 are mounted for idling on the substantially J-shaped rods 16 and 17. These rods are duplicates of one another, and as shown in Figure 2, have their main linearly straight portions slidable vertically in the sleeves 12. The lower out-turned end portions 18 constitute journals on which the wheels are mounted for rotation. It will be noticed that the vertical shaft portions of the rods are provided with grooves 19 which serve as key-ways for key-forming set screws 20 carried by the stated sleeves.

The adjustable framework of the carriage serves as a satisfactory and convenient means to accommodate the canvas or equivalent body saddling sling 21. The longitudinal edge portions of the sling are provided with snap fasteners 22 which are engaged with the aforementioned snap fasteners 13. Not only do the frame members 7 and 8 function to releasably carry the sling, but they also function to accommodate straps 23 and 24, which straps, in turn, serve to harness the sling on the body of the animal. The sling is provided with oval or equivalently shaped openings 25 to accommodate the hind legs of the dog, in the manner shown. Thus, the sling is applied partly to the legs and fastens primarily against the underside of the body. The cross-piece 14 is not intended to come into pressure contact with the body and is merely a connector between the two triangular frame units of the overall framework, as is obvious. The sling may be raised up and down, as desired; that is to say, the horizontal plane of the sling may be varied to suit circumstances, whereby the feet of the rear legs are propelled clear and above the ground or other surface. Or, the feet may be lowered so that they either lightly or fully contact the surface, depending on bearing requirements and conditions. It is, of course, difficult to classify the different types of injuries and handicaps which may prevail to render the instant appliance aptly useful as a mechanical aid and tender. It is believed, however, that there are sufficient difficulties met in this line of endeavor where the appliance may be used indefinitely or temporarily, as circumstances require, to be of considerable service to a lame or crippled dog or animal. In practice, if desired, an additional breast strap (not shown) may be used to coact with the stated harnessing straps 23 and 24 to render the position of the carriage more secure.

In the case of an animal who is suffering from permanent paralysis or one who has a broken member, a flap can go over the leg holes in the hammock-like sling and the hind-quarters will be immobile, although he will still be able to move about. An animal who is recuperating from a leg injury will have the advantage of strengthening and exercising his legs through the leg holes and yet not having the full weight of his body on his legs.

The canvas sling will be removable from the frame by snap fasteners, or clip-on fasteners to make it possible to remove and wash it.

The framework is to be of any substantial lightweight metal with adjustable legs, either to be made so by a thumb screw at the socket, or else to have the wheel strut threaded through the socket with a lock nut on the top of the socket and on the bottom to tighten to keep the wheel in adjustment to the height of the animal, and to keep them in alignment. A metal band on the front bottom fastening the two side frames rigidly together will keep the wheels in alignment and will be braced so as to make it impossible for the wheels to toe in or out. This brace will in no way reach the animal's body in the sling, but must be sufficiently away from the sling for the freedom of the dog's body in movement. Other braces may be added to strengthen the two sides, but none may inhibit the movement of the rear legs. Two leather straps at the top of the frame fasten the animal's body into the sling, and the canvas sides must come more than half-way of the animal to make it more comfortable and have full benefit of its purpose of a sling; still having the animal secured but not tightly bound by the straps and sling. The general purpose of this invention is for strictly humane purposes and shall be so constructed as to simplicity, lightweight, sturdy and as comfortable to the animal as possible.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. An ambulatory-type mechanical aid for crippled dogs and the like comprising an abdominal embracing suspensory-type canvas sling provided, at one end portion, with leg openings, a pair of wheel-supported frame units, opposite end portions of said sling being detachably connected with said units, a substantially rigid strap member connecting said units in spaced parallelism, said strap member being longitudinally curved, and harnessing straps, said straps being adjustable and connected with said frame units and being adapted to extend across the back of the dog, whereby to permit the body of the dog to be strapped and cradled in said sling between the frame units, with the legs of the dog extending through said leg openings.

2. The structure specified in claim 1, said strap member being of a degree of curvature relative to the abdomen of the dog to arch beneath said abdomen fully free of contact with latter.

3. As a component part of a mobile conveyance of the class shown and described, a frame structure comprising a pair of substantially triangular frame units embodying horizontal frame members adapted to support a canvas sling therebetween, diverging braces connected with said frame members, sockets secured rigidly between the converging end portions of the respective braces, said sockets being adapted to accommodate adjustable wheel-equipped struts, and a substantially rigid longitudinally bowed strap member connected at opposite ends to corresponding end portions of said frame units and adapted to maintain the frame units in spaced parallelism in respect to each other.

4. An animal propelled and self-steered ambulatory mechanical aid for a crippled dog comprising a framework embodying a pair of opposed vertically disposable rigid frame units, each frame unit embodying a horizontal bar member provided with snap fasteners and further including coacting braces and socket members carried by the braces, wheel-supported struts, said struts being adjustably connected with said socket members, a longitudinally curved rigid strap member securing forward ends of said frame units in predetermined spaced parallelism, a substantially rectangular piece of washable canvas having corresponding edge portions provided with snap fasteners and connected with the fasteners on said horizontal members, said canvas being looped between the units to provide a saddle to suspend the abdominal portion of the dog, and being provided at an end, opposite to said strap member, with leg openings.

CARL C. CREAMER, Jr.

REFERENCES CITED

The following references are of record in the file of this patent:

UNITED STATES PATENTS

| Number | Name | Date |
|---|---|---|
| 833,119 | Buckingham | Oct. 9, 1906 |
| 1,176,876 | Vartabedian | Mar. 28, 1916 |
| 2,176,551 | Solem | Oct. 17, 1939 |
| 2,190,091 | Wolfe | Feb. 13, 1940 |

OTHER REFERENCES

Washington Star; May 28, 1936, page A-3 (Copy in Div. 5).

Washington Times-Herald; July 9, 1939, page 4 of magazine section (Copy in Division 5).